(12) United States Patent
Lisch et al.

(10) Patent No.: US 8,714,964 B2
(45) Date of Patent: May 6, 2014

(54) BLOW NOZZLE TO CONTROL LIQUID FLOW WITH PRE-STRETCH ROD ASSEMBLY

(75) Inventors: G. David Lisch, Jackson, MI (US); Kirk Edward Maki, Tecumseh, MI (US)

(73) Assignee: Amcor Limited, Hawthom (AU)

( * ) Notice: Subject to any disclaimer, the term of this patent is extended or adjusted under 35 U.S.C. 154(b) by 153 days.

(21) Appl. No.: 13/267,974

(22) Filed: Oct. 7, 2011

(65) Prior Publication Data

US 2012/0093965 A1    Apr. 19, 2012

Related U.S. Application Data

(60) Provisional application No. 61/393,408, filed on Oct. 15, 2010.

(51) Int. Cl.
*B29C 49/12*    (2006.01)
*B29C 49/58*    (2006.01)

(52) U.S. Cl.
USPC ............................ 425/524; 425/529; 425/535

(58) Field of Classification Search
USPC ........................................ 425/524, 529, 535
See application file for complete search history.

(56) References Cited

U.S. PATENT DOCUMENTS

| | | |
|---|---|---|
| 3,267,185 A | 8/1966 | Freeman, Jr. |
| 3,268,635 A | 8/1966 | Kraus et al. |
| 3,993,427 A | 11/1976 | Kauffman et al. |
| 4,039,641 A | 8/1977 | Collins |
| 4,177,239 A | 12/1979 | Gittner et al. |
| 4,321,938 A | 3/1982 | Siller |
| 4,432,720 A | 2/1984 | Wiatt et al. |
| 4,457,688 A | 7/1984 | Calvert et al. |
| 4,490,327 A | 12/1984 | Calvert et al. |
| 4,499,045 A | 2/1985 | Obsomer |
| 4,539,172 A | 9/1985 | Winchell et al. |
| 4,725,464 A | 2/1988 | Collette |
| 4,883,631 A | 11/1989 | Ajmera |
| 4,935,190 A | 6/1990 | Tennerstedt |
| 5,129,815 A | 7/1992 | Miyazawa et al. |
| 5,269,672 A | 12/1993 | DiGangi, Jr. |

(Continued)

FOREIGN PATENT DOCUMENTS

| | | |
|---|---|---|
| EP | 0849514 | 6/1998 |
| EP | 1529620 | 5/2005 |

(Continued)

OTHER PUBLICATIONS

International Search Report and Written Opinion dated Apr. 17, 2012 in corresponding PCT International Patent Application No. PCT/US2011/051284 (nine pages).

(Continued)

*Primary Examiner* — Robert B Davis
(74) *Attorney, Agent, or Firm* — Harness, Dickey & Pierce, P.L.C.

(57) ABSTRACT

An apparatus for forming a container comprising a housing and a rod apparatus disposed in the housing. The rod apparatus includes a rod for at least partially forming a container preform. The apparatus further includes a nozzle system disposed in the housing that is operably coupled with the rod apparatus. The nozzle system is positionable between a first position preventing pressurized fluid from being injected into the container preform and a second position permitting pressurized fluid to be injected into the container preform.

29 Claims, 2 Drawing Sheets

(56) References Cited

U.S. PATENT DOCUMENTS

Figure 1:
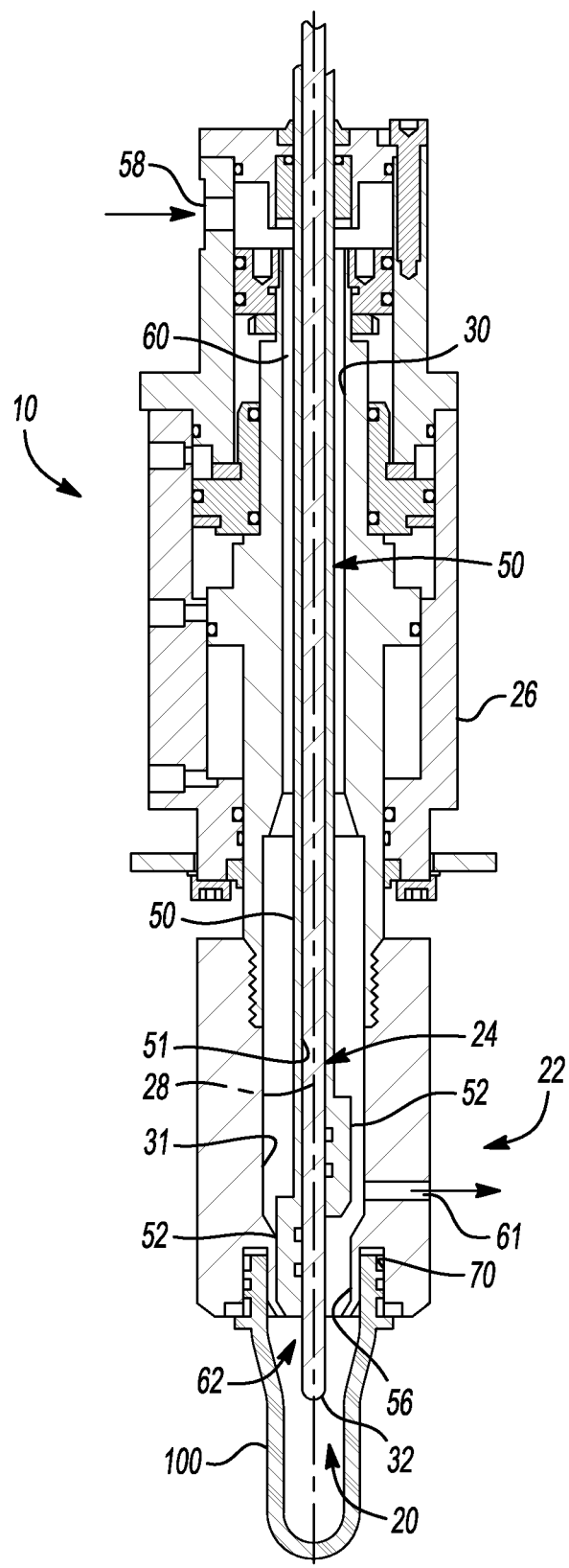

| | | | |
|---|---|---|---|
| 5,389,332 | A | 2/1995 | Amari et al. |
| 5,403,538 | A | 4/1995 | Maeda |
| 5,540,879 | A | 7/1996 | Orimoto et al. |
| 5,599,496 | A | 2/1997 | Krishnakumar et al. |
| 5,622,735 | A | 4/1997 | Krishnakumar et al. |
| 5,635,226 | A | 6/1997 | Koda et al. |
| 5,687,550 | A | 11/1997 | Hansen et al. |
| 5,824,237 | A | 10/1998 | Stumpf et al. |
| 5,962,039 | A | 10/1999 | Katou et al. |
| 6,214,282 | B1 | 4/2001 | Katou et al. |
| 6,277,321 | B1 | 8/2001 | Vailliencourt et al. |
| 6,485,670 | B1 | 11/2002 | Boyd et al. |
| 6,502,369 | B1 | 1/2003 | Andison et al. |
| 6,692,684 | B1 | 2/2004 | Nantin et al. |
| 6,729,868 | B1 | 5/2004 | Vogel et al. |
| 6,749,415 | B2 | 6/2004 | Boyd et al. |
| 6,767,197 | B2 | 7/2004 | Boyd et al. |
| 7,141,190 | B2 | 11/2006 | Hekal |
| 7,473,388 | B2 | 1/2009 | Desanaux et al. |
| 7,553,441 | B2 | 6/2009 | Shi |
| 7,914,726 | B2 | 3/2011 | Andison et al. |
| 7,981,356 | B2 | 7/2011 | Warner et al. |
| 8,017,064 | B2 | 9/2011 | Andison et al. |
| 8,096,483 | B2 | 1/2012 | Riney |
| 2001/0010145 | A1 | 8/2001 | Tawa et al. |
| 2005/0067002 | A1 | 3/2005 | Jones |
| 2005/0206045 | A1 | 9/2005 | Desanaux et al. |
| 2006/0097417 | A1 | 5/2006 | Emmer |
| 2006/0231646 | A1 | 10/2006 | Geary, Jr. |
| 2008/0254160 | A1 | 10/2008 | Rousseau et al. |
| 2008/0271812 | A1 | 11/2008 | Stefanello et al. |
| 2010/0084493 | A1 | 4/2010 | Troudt |
| 2010/0213629 | A1 | 8/2010 | Adriansens |
| 2010/0303946 | A1 | 12/2010 | Voth |
| 2011/0265433 | A1 | 11/2011 | Chauvin et al. |
| 2011/0285063 | A1* | 11/2011 | Chauvin et al. ............... 264/525 |
| 2012/0207872 | A1* | 8/2012 | Lisch et al. ................... 425/524 |

FOREIGN PATENT DOCUMENTS

| | | |
|---|---|---|
| EP | 1577258 | 9/2005 |
| EP | 1688234 | 8/2006 |
| EP | 2143545 A1 * | 1/2010 |
| FR | 2887525 | 12/2006 |
| JP | 57123027 | 7/1982 |
| JP | 63-249616 | 10/1988 |
| JP | 09057834 | 3/1997 |
| JP | 09099477 | 4/1997 |
| JP | 10-217258 | 8/1998 |
| JP | 2000-043129 | 2/2000 |
| JP | 2005-254704 | 9/2005 |
| JP | 2005-529002 | 9/2009 |
| KR | 10-0147442 | 8/1998 |
| KR | 2006-0105883 | 10/2006 |
| KR | 10-2006-0128062 | 12/2006 |
| WO | WO02/24435 | 3/2002 |
| WO | WO03/095179 | 11/2003 |
| WO | WO2004/065105 | 8/2004 |
| WO | WO2005/044540 | 5/2005 |
| WO | WO2007/120807 | 10/2007 |

OTHER PUBLICATIONS

International Search Report and Written Opinion dated Apr. 18, 2012 in corresponding PCT International Patent Application No. PCT/US2011/051289 (nine pages).

International Search Report and Written Opinion dated May 8, 2012 in corresponding International Patent Application No. PCT/US2011/054584 (six pages).

International Search Report and Written Opinion dated May 9, 2012 in corresponding International Patent Application No. PCT/US2011/056053 (six pages).

International Search Report and Written Opinion dated May 30, 2012 in corresponding International Patent Application No. PCT/US2011/056057 (six pages).

International Search Report and Written Opinion dated Jun. 15, 2012 in corresponding International Patent Application No. PCT/US2011/051293 (eight pages).

International Search Report and Written Opinion dated Oct. 29, 2012 in corresponding International Patent Application No. PCT/US2012/024950 (seven pages).

International Search Report and Written Opinion dated Sep. 28, 2012 in corresponding International Patent Application No. PCT/US2012/024954 (six pages).

* cited by examiner

BLOW NOZZLE TO CONTROL LIQUID FLOW WITH PRE-STRETCH ROD ASSEMBLY

CROSS-REFERENCE TO RELATED APPLICATIONS

This application claims the benefit of U.S. Provisional Application No. 61/393,408, filed on Oct. 15, 2010. The entire disclosure of the above application is incorporated herein by reference.

FIELD

This disclosure generally relates to molds for filling containers with a commodity, such as a liquid commodity. More specifically, this disclosure relates to a blow nozzle to control liquid flow with pre-stretch rod assemblies used for filling/forming blown plastic containers.

BACKGROUND

This section provides background information related to the present disclosure which is not necessarily prior art.

As a result of environmental and other concerns, plastic containers, more specifically polyester and even more specifically polyethylene terephthalate (PET) containers are now being used more than ever to package numerous commodities previously supplied in glass containers. Manufacturers and fillers, as well as consumers, have recognized that PET containers are lightweight, inexpensive, recyclable and manufacturable in large quantities.

Blow-molded plastic containers have become commonplace in packaging numerous commodities. PET is a crystallizable polymer, meaning that it is available in an amorphous form or a semi-crystalline form. The ability of a PET container to maintain its material integrity relates to the percentage of the PET container in crystalline form, also known as the "crystallinity" of the PET container. The following equation defines the percentage of crystallinity as a volume fraction:

$$\% \text{ Crystallinity} = \left(\frac{\rho - \rho_a}{\rho_c - \rho_a}\right) \times 100$$

where $\rho$ is the density of the PET material; $\rho_a$ is the density of pure amorphous PET material (1.333 g/cc); and $\rho_c$ is the density of pure crystalline material (1.455 g/cc).

Container manufacturers use mechanical processing and thermal processing to increase the PET polymer crystallinity of a container. Mechanical processing involves orienting the amorphous material to achieve strain hardening. This processing commonly involves stretching an injection molded PET preform along a longitudinal axis and expanding the PET preform along a transverse or radial axis to form a PET container. The combination promotes what manufacturers define as biaxial orientation of the molecular structure in the container. Manufacturers of PET containers currently use mechanical processing to produce PET containers having approximately 20% crystallinity in the container's sidewall.

Thermal processing involves heating the material (either amorphous or semi-crystalline) to promote crystal growth. On amorphous material, thermal processing of PET material results in a spherulitic morphology that interferes with the transmission of light. In other words, the resulting crystalline material is opaque, and thus, generally undesirable. Used after mechanical processing, however, thermal processing results in higher crystallinity and excellent clarity for those portions of the container having biaxial molecular orientation. The thermal processing of an oriented PET container, which is known as heat setting, typically includes blow molding a PET preform against a mold heated to a temperature of approximately 250° F.-350° F. (approximately 121° C.-177° C.), and holding the blown container against the heated mold for approximately two (2) to five (5) seconds. Manufacturers of PET juice bottles, which must be hot-filled at approximately 185° F. (85° C.), currently use heat setting to produce PET bottles having an overall crystallinity in the range of approximately 25%-35%.

Conventionally, blowing forming containers has always been accomplished using high-pressure air blowing into a softened plastic form, such as an injection molded preform or an extruded parison tube. Typically, a blow nozzle is introduced into the neck of the container and air pressure forms the container by blowing the softened plastic out to a mold. Separately, liquid filling nozzles, though designed to fill pre-blown containers, do not incorporate a stretching rod.

SUMMARY

This section provides a general summary of the disclosure, and is not a comprehensive disclosure of its full scope or all of its features.

According to the principles of the present disclosure, an apparatus for forming a container using a rod and pressurized fluid is provided. The apparatus comprises a housing and a rod apparatus disposed in the housing. The rod apparatus includes a rod for at least partially forming a container preform. The apparatus further includes a nozzle system disposed in the housing that is operably coupled with the rod apparatus. The nozzle system is positionable between a first position preventing pressurized fluid from being injected into the container preform and a second position permitting pressurized fluid to be injected into the container preform.

Further areas of applicability will become apparent from the description provided herein. The description and specific examples in this summary are intended for purposes of illustration only and are not intended to limit the scope of the present disclosure.

DRAWINGS

The drawings described herein are for illustrative purposes only of selected embodiments and not all possible implementations, and are not intended to limit the scope of the present disclosure.

Figure 2:
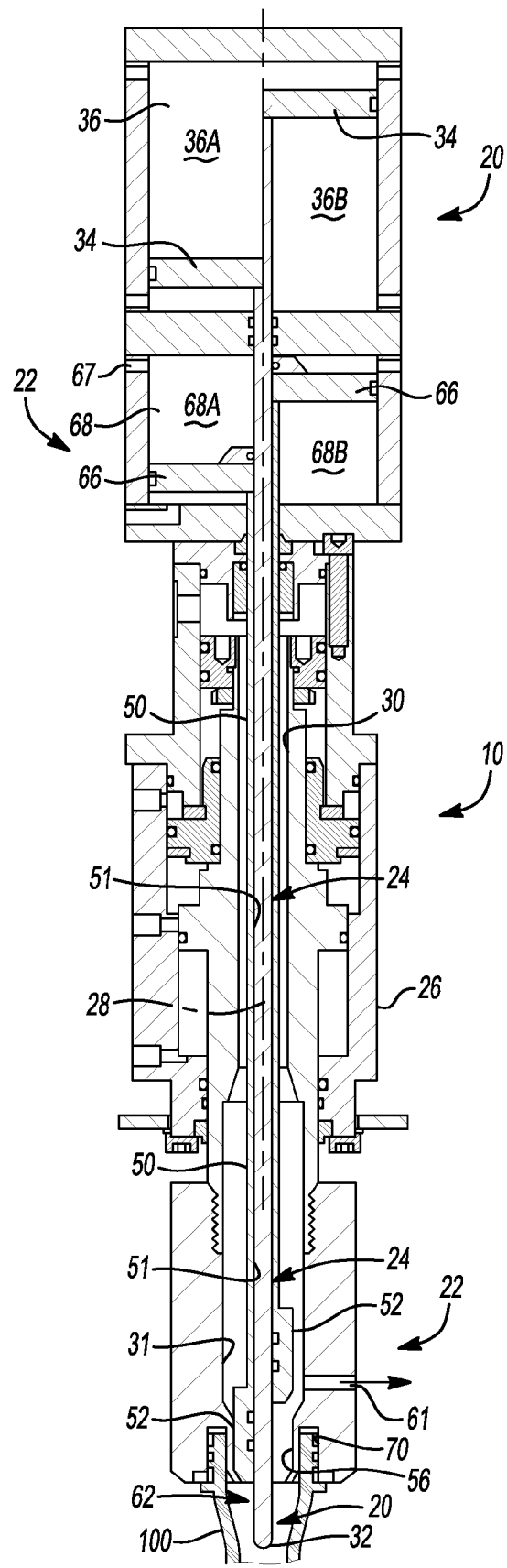

FIG. 1 is a partial, lower cross-sectional view illustrating an apparatus for forming a container using an optional stretch rod and pressurized liquid, wherein the portion left of the centerline illustrates an extended position and the portion right of the centerline illustrates a retracted position; and FIG. 2 is a partial, upper cross-sectional view illustrating the apparatus of FIG. 1 for forming a container using an optional stretch rod and pressurized liquid wherein the portion left of the centerline illustrates an extended position and the portion right of the centerline illustrates a retracted position.

Corresponding reference numerals indicate corresponding parts throughout the several views of the drawings.

DETAILED DESCRIPTION

Example embodiments will now be described more fully with reference to the accompanying drawings. Example embodiments are provided so that this disclosure will be thorough, and will fully convey the scope to those who are skilled in the art. Numerous specific details are set forth such as examples of specific components, devices, and methods, to provide a thorough understanding of embodiments of the present disclosure. It will be apparent to those skilled in the art that specific details need not be employed, that example embodiments may be embodied in many different forms and that neither should be construed to limit the scope of the disclosure.

The terminology used herein is for the purpose of describing particular example embodiments only and is not intended to be limiting. As used herein, the singular forms "a", "an" and "the" may be intended to include the plural forms as well, unless the context clearly indicates otherwise. The terms "comprises," "comprising," "including," and "having," are inclusive and therefore specify the presence of stated features, integers, steps, operations, elements, and/or components, but do not preclude the presence or addition of one or more other features, integers, steps, operations, elements, components, and/or groups thereof. The method steps, processes, and operations described herein are not to be construed as necessarily requiring their performance in the particular order discussed or illustrated, unless specifically identified as an order of performance. It is also to be understood that additional or alternative steps may be employed.

When an element or layer is referred to as being "on", "engaged to", "connected to" or "coupled to" another element or layer, it may be directly on, engaged, connected or coupled to the other element or layer, or intervening elements or layers may be present. In contrast, when an element is referred to as being "directly on," "directly engaged to", "directly connected to" or "directly coupled to" another element or layer, there may be no intervening elements or layers present. Other words used to describe the relationship between elements should be interpreted in a like fashion (e.g., "between" versus "directly between," "adjacent" versus "directly adjacent," etc.). As used herein, the term "and/or" includes any and all combinations of one or more of the associated listed items.

Although the terms first, second, third, etc. may be used herein to describe various elements, components, regions, layers and/or sections, these elements, components, regions, layers and/or sections should not be limited by these terms. These terms may be only used to distinguish one element, component, region, layer or section from another region, layer or section. Terms such as "first," "second," and other numerical terms when used herein do not imply a sequence or order unless clearly indicated by the context. Thus, a first element, component, region, layer or section discussed below could be termed a second element, component, region, layer or section without departing from the teachings of the example embodiments.

Spatially relative terms, such as "inner," "outer," "beneath", "below", "lower", "above", "upper" and the like, may be used herein for ease of description to describe one element or feature's relationship to another element(s) or feature(s) as illustrated in the figures. Spatially relative terms may be intended to encompass different orientations of the device in use or operation in addition to the orientation depicted in the figures. For example, if the device in the figures is turned over, elements described as "below" or "beneath" other elements or features would then be oriented "above" the other elements or features. Thus, the example term "below" can encompass both an orientation of above and below. The device may be otherwise oriented (rotated 90 degrees or at other orientations) and the spatially relative descriptors used herein interpreted accordingly.

The present teachings provide for a blow mold device and nozzle system, and method of using the same, to permit the use of liquids as an injecting agent during the forming process. These liquids can be a disposable liquid or, in some embodiments, can comprise the liquid commodity. Therefore, in some embodiments, the liquids used for forming the container can remain therein for final packaging. The blow mold device and nozzle system provides controlled use of the liquid to minimize chances of contamination and prevent leakage during cycling. According to these principles, formation and filling of a container can be achieved in a single step without sacrificing clean and sanitary conditions.

As will be discussed in greater detail herein, the shape of the mold device and nozzle system of the present teachings and the container formed therewith can be formed according to any one of a number of variations. By way of non-limiting example, the mold of the present disclosure can be configured to hold any one of a plurality of containers and be used in connection with a number of fluids and commodities, such as beverages, food, or other hot-fill type materials.

It should be appreciated that the size and the exact shape of the mold device and nozzle system are dependent on the size of the container and the required operational parameters. Therefore, it should be recognized that variations can exist in the presently described designs. According to some embodiments, it should also be recognized that the mold can comprise various features for use with containers having vacuum absorbing features or regions, such as panels, ribs, slots, depressions, and the like.

The present teachings relate to the forming of one-piece plastic containers using a liquid. Generally, these containers, after formation, generally define a body that includes an upper portion having a cylindrical sidewall forming a finish. Integrally formed with the finish and extending downward therefrom is a shoulder portion. The shoulder portion merges into and provides a transition between the finish and a sidewall portion. The sidewall portion extends downward from the shoulder portion to a base portion having a base. An upper transition portion, in some embodiments, may be defined at a transition between the shoulder portion and the sidewall portion. A lower transition portion, in some embodiments, may be defined at a transition between the base portion and the sidewall portion.

The exemplary container may also have a neck. The neck may have an extremely short height, that is, becoming a short extension from the finish, or an elongated height, extending between the finish and the shoulder portion. The upper portion can define an opening. Although the container is shown as a drinking container and a food container, it should be appreciated that containers having different shapes, such as sidewalls and openings, can be made according to the principles of the present teachings.

The finish of the plastic container may include a threaded region having threads, a lower sealing ridge, and a support ring. The threaded region provides a means for attachment of a similarly threaded closure or cap (not illustrated). Alternatives may include other suitable devices that engage the finish of the plastic container, such as a press-fit or snap-fit cap for example. Accordingly, the closure or cap (not illustrated) engages the finish to preferably provide a hermetical seal of the plastic container. The closure or cap (not illustrated) is preferably of a plastic or metal material conventional to the closure industry and suitable for subsequent thermal processing.

The container can be formed according to the principles of the present teachings. A preform version of the container includes a support ring, which may be used to carry or orient the preform through and at various stages of manufacture. For example, the preform may be carried by the support ring, the support ring may be used to aid in positioning the preform in a mold cavity, or the support ring may be used to carry an intermediate container once molded. At the outset, the preform may be placed into the mold cavity such that the support ring is captured at an upper end of the mold cavity. In general, the mold cavity has an interior surface corresponding to a desired outer profile of the blown container. More specifically, the mold cavity according to the present teachings defines a body forming region, an optional moil forming region and an optional opening forming region. Once the resultant structure, hereinafter referred to as an intermediate container, has been formed, any moil created by the moil forming region may be severed and discarded. It should be appreciated that the use of a moil forming region and/or opening forming region are not necessarily in all forming methods.

In one example, a machine places the preform 100 (see FIG. 1) heated to a temperature between approximately 190° F. to 250° F. (approximately 88° C. to 121° C.) into the mold cavity. The mold cavity may be heated to a temperature between approximately 250° F. to 350° F. (approximately 121° C. to 177° C.). An internal stretch rod apparatus 20 (see FIGS. 1 and 2) stretches or extends the heated preform within the mold cavity thereby molecularly orienting the polyester material in an axial direction generally corresponding with the central longitudinal axis of the container. While the stretch rod extends the preform, a liquid assists in extending the preform in the axial direction and in expanding the preform in a circumferential or hoop direction thereby substantially conforming the polyester material to the shape of the mold cavity and further molecularly orienting the polyester material in a direction generally perpendicular to the axial direction, thus establishing the biaxial molecular orientation of the polyester material in some, most, or all of the intermediate container. In some embodiments, the pressurized liquid holds the mostly biaxial molecularly oriented polyester material against the mold cavity for a period of time before removal of the intermediate container from the mold cavity.

With particular reference to FIGS. 1 and 2, a mold device and nozzle system 10 is provided comprising internal stretch rod apparatus 20 and a nozzle system 22 formed therewith that are each independently actuatable and yet, in some embodiments, actuatable simultaneously. Internal stretch rod apparatus 20 comprises a stretch rod member assembly 24 being slidably disposed within a housing 26. The internal stretch rod member assembly 24 and nozzle system 22 are illustrated in both an extended and retracted positions (left of centerline CL in FIGS. 1 and 2 and right of centerline CL in FIGS. 1 and 2, respectively). Stretch rod member assembly 24 can comprise a stretch rod 28 being slidably disposed (at least indirectly) within a central bore 30 of housing 26. Stretch rod 28 is generally cylindrical in shape having an engaging tip portion 32 at a distal end and a piston portion 34 at a proximal end. Tip portion 32 is shaped to engage preform 100 during manufacture, shaping, and/or filling. Piston portion 34 is received within a piston chamber 36 to closely conform therewith to define a piston assembly (for example pneumatic, hydraulic, servo, mechanical or the like). Piston portion 34 is responsive to changes in pneumatic, hydraulic, servo, mechanical or the like pressure within piston chambers 36A and 36B, thereby causing piston portion 34 to move in a direction generally aligned with centerline CL between an extended position (left side) and a retracted position (right side). Movement of piston portion 34 thereby causes associated movement of stretch rod 28 and tip portion 32.

Additionally, in some embodiments, nozzle system 22 comprises a seal rod 50 being slidably disposed within housing 26. That is, nozzle system 22 can comprise a seal rod 50 being slidably disposed within central bore 30 of housing 26. Seal rod 50 includes an engaging seal portion 52 at a distal end and a piston portion 66 at a proximal end. Seal portion 52 is shaped to engage a narrowed distal portion 56 of central bore 30. In this way, seal portion 52 can be position in a retracted position where seal portion 52 is spaced apart from an enlarged intermediate portion 31 of central bore 30 to permit the flow of liquid there past. Seal portion 52 can also be positioned in an extended and seated position where seal portion 52 sealingly engages narrowed distal portion 56. In the extended and seated position, seal portion 52 permits liquid to flow from a fluid inlet 58, through an annulus 60 of central bore 30 to enlarged intermediated portion 31 of central bore 30. However, in this position, flow out of nozzle system 22 is prohibited. In the retracted position, seal portion 52 is spaced apart from narrowed distal portion 56 and thus permits liquid to flow from fluid inlet 58, through annulus 60 of central bore 30 to enlarged intermediated portion 31 of central bore 30 and out fluid injector 62 and into preform 100. The fluid pressure within preform 100 causes preform 100 to expand and be molded into a predetermined shape conforming to the mold cavity. To achieve a desired final shape, fluid pressure typically needs to be selected that is sufficiently high to urge the preform into all portions of the mold cavity. Upon completion of the molding process, seal portion 52 can return to the extended and seated position to thereby seal fluid injector 62 and prevent further flow of the liquid from the nozzle.

Seal portion 52 is moved in response to movement of piston portion 66. Piston portion 66 of nozzle system 22 is received within a piston chamber 68 to closely conform therewith to define a piston assembly. Piston portion 66 is responsive to changes in pressure from inlet 67 within piston chambers 68A and 68B, thereby causing piston portion 66 to move in a direction generally aligned with centerline CL between the extended and seated position (left side) and the retracted position (right side). Movement of piston portion 66 thereby causes associated movement of seal rod 50 and seal portion 52. It should be appreciated, however, that although pressurized liquid has been discussed in connection with the present teachings, in some embodiments, pressurized air or a combination of pressurized air and liquid can be used. Moreover, it should be appreciated that the pressurized liquid can be a forming liquid used only for molding or could be a liquid commodity that is intended to remain within the container upon completion.

With continued reference to FIGS. 1 and 2, in some embodiments, stretch rod 28 of stretch rod assembly 24 can be slidably disposed within seal rod 50 of nozzle system 22. That is, seal rod 50 can comprise a central seal rod slot or bore 51 that extends axially along seal rod 50. Seal rod slot 51 can be generally sized and shaped to permit slidably movement relative to stretch rod 28 to permit independent and/or simultaneous actuation of either or both stretch rod assembly 24 and nozzle system 22. In some embodiments, seal rod slot 51 can be generally cylindrical and stretch rod 28 can likewise be generally cylindrical. In this way, stretch rod 28 and seal rod 50 can be coaxially aligned within central bore 30. Moreover, as discussed herein, in some embodiments an annulus 60 can be formed external to seal rod 50 within central bore 30.

In some embodiments, as illustrated in FIG. 1, housing 26 can comprise a ring depression 70 formed along a bottom side of housing 26 to sealingly receive preform 100 along the threaded region, the lower sealing ridge, and/or the support ring.

Alternately, other manufacturing methods using other conventional materials including, for example, thermoplastic, high density polyethylene, polypropylene, polyethylene naphthalate (PEN), a PET/PEN blend or copolymer, and various multilayer structures may be suitable for the manufacture of the plastic container. Those having ordinary skill in the art will readily know and understand plastic container manufacturing method alternatives.

The foregoing description of the embodiments has been provided for purposes of illustration and description. It is not intended to be exhaustive or to limit the invention. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the invention, and all such modifications are intended to be included within the scope of the invention.

What is claimed is:

1. An apparatus for forming a container, said apparatus comprising:
    a housing;
    a rod apparatus disposed in said housing, said rod apparatus having a rod for at least partially forming a container preform; and
    a nozzle system disposed in said housing and operably coupled with said rod apparatus, said nozzle system being actuatable between a first position preventing pressurized fluid from being injected into the container preform and a second position permitting pressurized fluid to be injected into the container preform.

2. The apparatus according to claim 1 wherein said rod is movable between an extended position and a retracted position and controllable to positions therebetween.

3. The apparatus according to claim 2 wherein said rod is independently actuatable relative to said nozzle system.

4. The apparatus according to claim 2 wherein said rod is independently and simultaneously actuatable relative to said nozzle system.

5. The apparatus according to claim 1 wherein said housing includes a central bore, said rod being slidably disposed within said central bore.

6. The apparatus according to claim 5 wherein said nozzle system includes a seal rod, said seal rod forming a seal interface when said nozzle system is in said first position preventing pressurized fluid from being injected into the container preform, said seal rod being disposed in said central bore of said housing.

7. The apparatus according to claim 5 wherein said seal rod comprising a seal rod slot, said rod being slidably disposed within said seal rod slot.

8. The apparatus according to claim 7 wherein said rod and said seal rod are coaxially aligned.

9. The apparatus according to claim 1 wherein said nozzle system comprises a seal rod being slidably disposed within said housing, said seal rod having a seal portion on a distal end thereof.

10. The apparatus according to claim 9 wherein said nozzle system comprises a piston disposed on a proximal end of said seal rod for movement therewith, said piston being movable in response to a force exerted thereon.

11. The apparatus according to claim 1 wherein said rod apparatus comprises a piston disposed on a proximal end of said rod for movement therewith, said piston being movable in response to a force exerted thereon.

12. The apparatus according to claim 11 wherein said rod includes a tip portion disposed on a distal end thereof physically engagable with the container preform.

13. The apparatus according to claim 1 wherein said housing includes a central bore and said nozzle system includes a seal rod being slidably disposed within said central bore, said seal rod forming a seal interface when said nozzle system is in said first position preventing pressurized fluid from being injected into the container preform.

14. The apparatus according to claim 1 wherein said nozzle system comprises:
    a central bore extending through said housing and said rod includes a tip portion on a distal end thereof engagable with the container preform and a piston member on a proximal end thereof, said rod being disposed in said central bore, said piston member being actuatable in response to a pressure means to actuate said rod between an extended position and a retracted position.

15. The apparatus according to claim 1 wherein said nozzle system comprises:
    a central bore extending through said housing; and
    a seal rod having a seal portion on a distal end thereof engagable with a portion of the central bore and a piston member on a proximal end thereof, said seal rod being disposed in said central bore, said piston member being actuatable in response to a pressure means to actuate said seal rod between said first position preventing said pressurized fluid from being injected into the container preform and said second position permitting said pressurized fluid to be injected into the container preform.

16. An apparatus for forming a container, said apparatus comprising:
    a housing having a central bore;
    a stretch rod apparatus disposed in said housing, said stretch rod apparatus having a stretch rod extending through said central bore for at least partially forming a container preform; and
    a nozzle system disposed in said housing and operably coupled with said stretch rod apparatus, said nozzle system having a seal rod extending through said central bore being generally coaxial with said stretch rod, said nozzle system being positionable between a first position preventing pressurized fluid from being injected into the container preform and a second position permitting pressurized fluid to be injected into the container preform.

17. The apparatus according to claim 16 wherein said stretch rod is movable between an extended position and a retracted position.

18. The apparatus according to claim 17 wherein said stretch rod is independently actuatable relative to said nozzle system.

19. The apparatus according to claim 17 wherein said stretch rod is independently and simultaneously actuatable relative to said nozzle system.

20. The apparatus according to claim 16 wherein said stretch rod is slidably disposed within said central bore.

21. The apparatus according to claim 20 wherein said seal rod forming a seal interface when said nozzle system is in said first position preventing pressurized fluid from being injected into the container preform.

22. The apparatus according to claim 20 wherein said seal rod comprising a seal rod slot, said stretch rod being slidably disposed within said seal rod slot of said seal rod.

23. The apparatus according to claim 16 wherein said seal rod is slidably disposed within said central bore of said housing, said seal rod having a seal portion on a distal end thereof.

24. The apparatus according to claim 23 wherein said nozzle system comprises a piston disposed on a proximal end of said seal rod for movement therewith, said piston being movable in response to a force exerted thereon.

25. The apparatus according to claim 16 wherein said stretch rod apparatus comprises a piston disposed on a proximal end of said stretch rod for movement therewith, said piston being movable in response to a force exerted thereon.

26. The apparatus according to claim 25 wherein said stretch rod includes a tip portion disposed on a distal end thereof physically engagable with the container preform.

27. The apparatus according to claim 16 wherein said housing includes a central bore and said nozzle system includes a seal rod being slidably disposed within said central bore, said seal rod forming a seal interface when said nozzle system is in said first position preventing pressurized fluid from being injected into the container preform.

28. The apparatus according to claim 16 wherein said stretch rod includes a tip portion on a distal end thereof engagable with the container preform and a piston member on a proximal end thereof, said piston member being actuatable in response to a pressure means to actuate said stretch rod between an extended position and a retracted position.

29. The apparatus according to claim 16 wherein said seal rod comprises a seal portion on a distal end thereof engagable with a portion of the central bore and a piston member on a proximal end thereof, said piston member being actuatable in response to a pressure means to actuate said seal rod between said first position preventing said pressurized fluid from being injected into the container preform and said second position permitting said pressurized fluid to be injected into the container preform.

* * * * *